United States Patent [19]

Schulz et al.

[11] 4,353,723
[45] Oct. 12, 1982

[54] PLEATED FILTER PACK AND METHOD OF MAKING SAME

[76] Inventors: Rainer Schulz, Eichenstrasse 1, 5820 Gevelsberg; Wilfried Schulz, Oststr. 49, 4322 Sprockhövel, both of Fed. Rep. of Germany

[21] Appl. No.: 228,289

[22] Filed: Jan. 26, 1981

[30] Foreign Application Priority Data

Jan. 31, 1980 [DE] Fed. Rep. of Germany ....... 3003409

[51] Int. Cl.³ .............................................. B01D 46/10
[52] U.S. Cl. ..................................... 55/521; 156/226; 156/227; 428/286
[58] Field of Search ................... 55/497–500, 55/521; 210/493.1, 493.3, 493.5; 156/204, 226, 227, 473; 428/286, 287

[56] References Cited

U.S. PATENT DOCUMENTS

| | | | |
|---|---|---|---|
| 3,621,640 | 11/1971 | Ohno et al. | 55/499 |
| 3,631,582 | 1/1972 | Lucas et al. | 55/521 |
| 3,692,184 | 9/1972 | Miller et al. | |
| 3,871,851 | 3/1975 | Neumann | 55/521 |
| 4,135,900 | 1/1979 | Westlin et al. | 210/493.3 |
| 4,147,524 | 4/1979 | Smith et al. | 55/521 |
| 4,187,091 | 2/1980 | Durre et al. | 55/521 |

FOREIGN PATENT DOCUMENTS

| | | | |
|---|---|---|---|
| 1093188 | 11/1960 | Fed. Rep. of Germany . | |
| 2718217 | 11/1978 | Fed. Rep. of Germany | 55/521 |
| 2835181 | 1/1980 | Fed. Rep. of Germany . | |
| 781194 | 8/1957 | United Kingdom | 55/521 |

Primary Examiner—Bernard Nozick
Attorney, Agent, or Firm—Montague & Ross

[57] ABSTRACT

A filter pack for the purification of air and gases comprises an undulating sheet of elastic fleece, e.g. one made from polyester fibers, sandwiched between two sets of similarly folded parallel retaining strips interspersed with the undulations of the sheet so that each strip forms a plurality of integrally interconnected U-shaped pleats with the legs of adjacent pleats closely juxtaposed. The strips, or at least outer surface layers thereof, consist of heat-fusible material enabling the closely juxtaposed legs of their pleats to be thermally bonded together after pleating. The strips may also be made from fleece so that bonding takes place only at contact points between their fibers, allowing the filtered fluid to pass both between and through the strips. Similar bonding may take place between the strips and the sheet.

3 Claims, 3 Drawing Figures

PLEATED FILTER PACK AND METHOD OF MAKING SAME

FIELD OF THE INVENTION

Our present invention relates to a filter pack forming a multiplicity of plies of porous material that are successively traversed by the air or gases to be purified.

BACKGROUND OF THE INVENTION

U.S. Pat. No. 3,692,184, for example, shows a filter pack of this general type in which folds of filter paper are held in position by bands of adhesive material entering the intervening spaces A similar device is disclosed in German printed specification No. 1,093,188 of Nov. 17, 1960; there a pleated sheet of filter paper is provided on opposite sides with two sets of parallel, spaced-apart adhesive threads which hold the pleats together after stacking and compression. The adhesive threads also act as spacers maintaining a certain clearance between adjacent pleats so as to increase the dust-absorbing capacity of the filter pack.

In commonly owned German printed specification No. 28 35 181, published Jan. 31, 1980, an improved filter assembly of this type has been disclosed in which the adhesive threads of the earlier device are replaced by retaining strips of inherently nonbonding character between which an undulating filter sheet is sandwiched. These strips serve as carriers for a bonding agent which, however, does not penetrate between closely juxtaposed legs of integrally interconnected U-shaped pleats that are formed by the strips and are interspersed with the sheet undulations. Instead, the adhesive merely fills the gaps between the bights of adjoining U-shaped pleats of the strips which are thereby rigidified to form two relatively staggered sets of multiprong clamps bracketing and gripping the undulating filter sheet from opposite sides. The filter sheet is described as consisting of an elastically compressible fleece of filamentary material, specifically spun glass fibers, which resembles cotton wadding and may be stabilized by a glass-fiber netting on its surfaces. The strips are said to consist of a less compressible fleece, e.g. of polyethylene fibers.

In order to apply the adhesive to the retaining strips of such a filter pack, the undulating sheet with folded-in strip zones must first be laid on a table whereupon the bights of the strips exposed at the upper surface of the assembly can be coated with the adhesive. After the bonding agent has hardened along that surface, the assembly is reversed and the remaining bights are similarly coated. Attempts to cement the strips to the glass-fiber fleece have proven unsuccessful because the adhesive is rapidly absorbed into the interstices of the fleece. Thus, the prongs of the clamps formed by the rigidified strips are held in position between the sheet undulations essentially by the surface roughness of the contacting filamentary members.

OBJECTS OF THE INVENTION

An object of the present invention is to provide a further improvement in a filter pack of the general structure last described which is simpler to assemble while retaining all the advantages of the prior device.

A related object is to provide a method of assembling such a filter pack, including two sets of retaining strips engaging the undulating sheet from opposite sides, without the need for two separate bonding operations.

It is also an object of our invention to provide a firmer connection between the sheet and its retaining strips.

SUMMARY OF THE INVENTION

In accordance with our present invention, the retaining strips consist in whole or in part—at least at surfaces remote from the sheet—of heat-fusible material and have the closely juxtaposed legs of their U-shaped pleats thermally bonded to each other between sheet undulations embraced by these pleats.

In principle, the retaining strips could consist of nonporous flexible material coated merely on their outer surfaces with a heat-fusible layer, advantageously a thermoplastic resin. We prefer, however, to use for the strips a fleece of thermoplastic fibers such as polyethylene filaments which is permeable to the gaseous fluid to be filtered since, in that case, the bonding between adjacent strip legs will take place only at points of contact between respective filaments thereof. If, pursuant to a further feature of our invention, the sheet consists of a similar fleece of thermoplastic filaments, such point-contact bonding may also occur between the sheet and the strips which are thereby joined together in a more positive manner than in the prior device.

The thermal bonding can be conveniently achieved by subjecting folded portions of the sheet and strips to radiant heat while progressively pleating other parts thereof whereby a stack of indefinite height, subject to later cutting into sections, can be produced. With two sets of strips forming bights on opposite sides of the stack, the two sides can be irradiated simultaneously in a one-stage operation.

BRIEF DESCRIPTION OF THE DRAWING

Our invention will now be described in greater detail with reference to the accompanying drawing in which.

SPECIFIC DESCRIPTION

Figure 1:
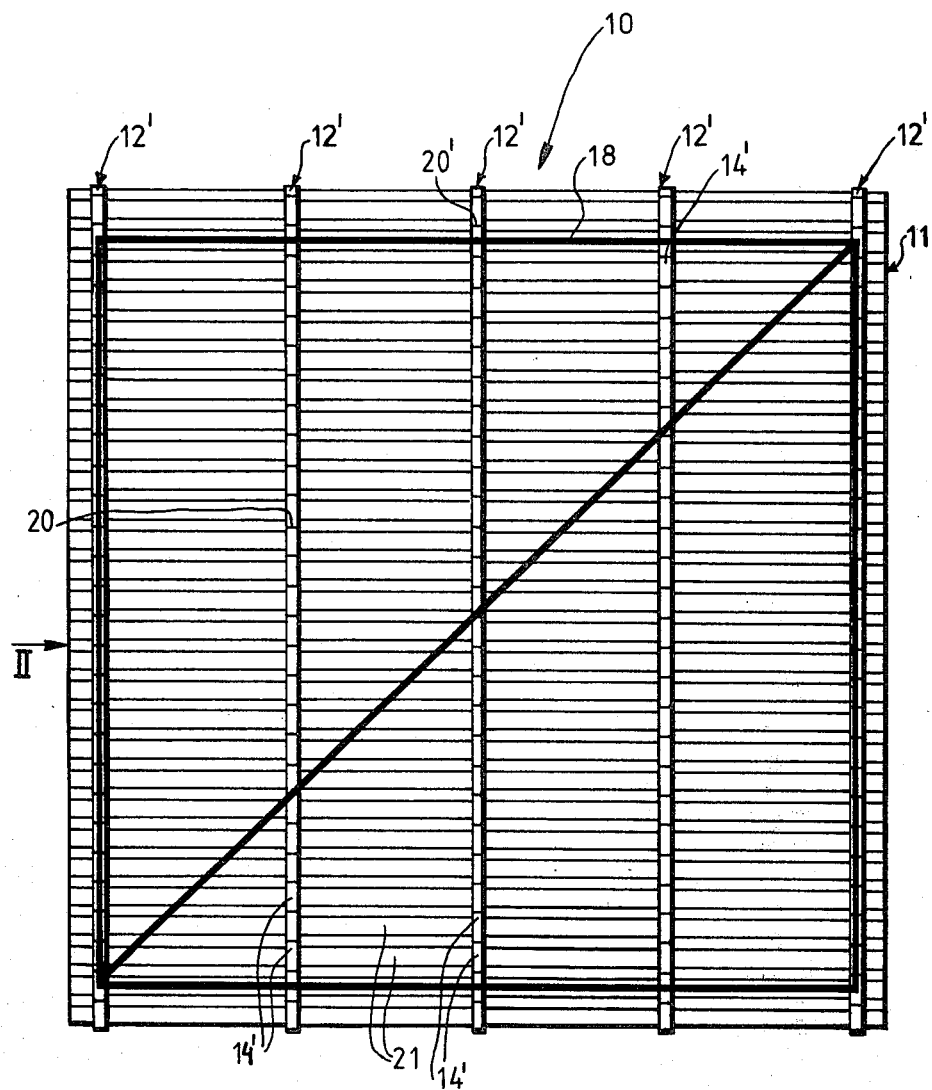
FIG. 1 is a front-elevational view of a filter pack embodying the present improvement.
Figure 2:
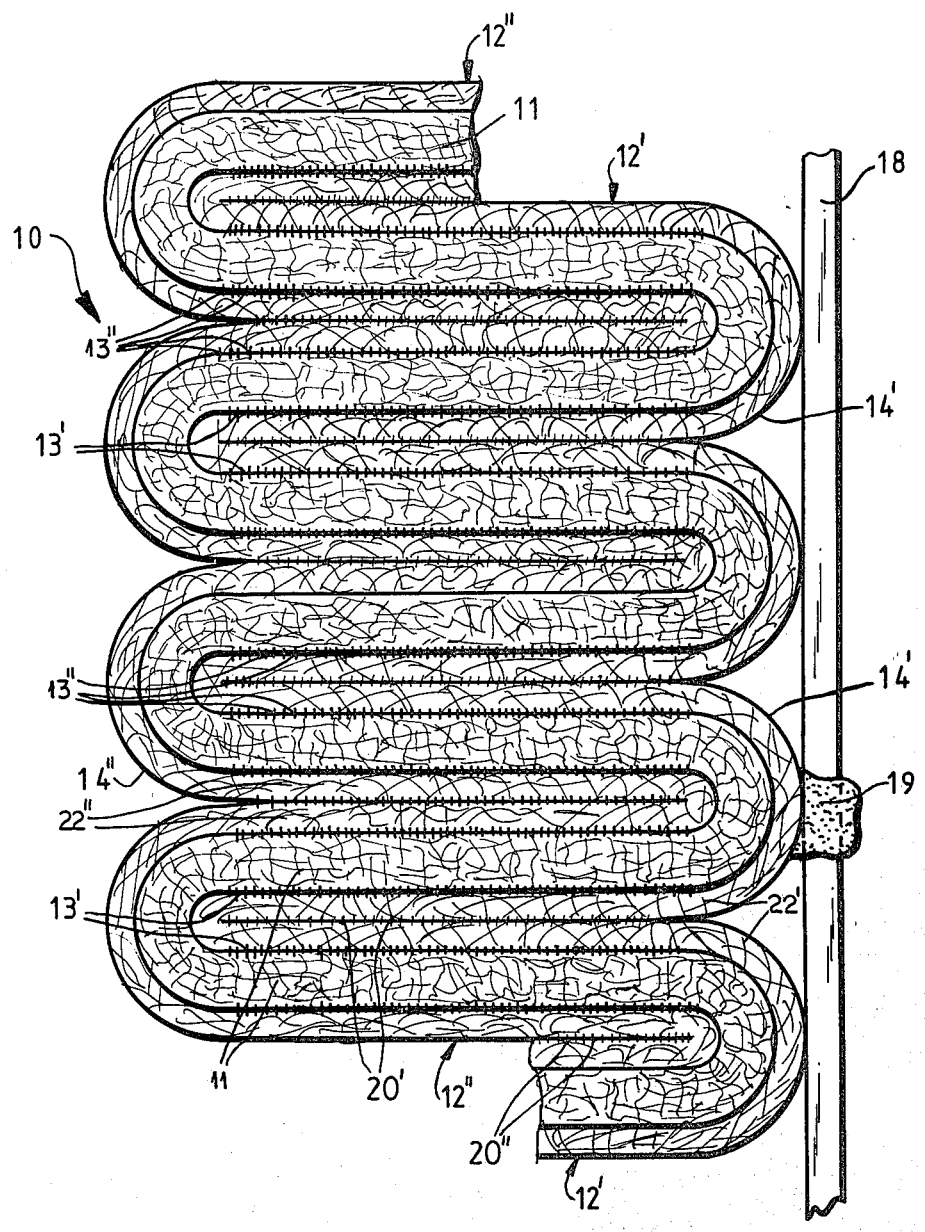
FIG. 2 is a fragmentary side-elevational view as seen in the direction of arrow II in FIG. 1, drawn to a larger scale.

In FIG. 1 we have shown a filter pack 10, generally similar to that disclosed in commonly owned German printed specification No. 28 35 181, which comprises a sheet 11 of porous material folded into a series of undulations as seen in FIG. 2. The sheet 11 is overlain on opposite sides by respective sets of five retaining strips each, the strips on one side (visible in FIG. 1) being designated 12' while those on the opposite side are designated 12". A supporting frame 18, of metal or plastic material, is bonded at intermittent locations to the two outermost strips 12' seen in FIG. 1; one such location has been illustrated at 19 in FIG. 2.

Confronting strips 12' and 12" are preferably aligned with each other; with a stack of fixed height as shown in FIG. 1, each pair of aligned strips may be formed by respective halves of an integral band encircling the sheet 11.

In the embodiment about to be described with reference to FIG. 2, both the sheet 11 and the strips 12', 12" are assumed to consist of polyethylene fleece. The sheet 11 may have a thickness on the order of 1 cm, e.g. in a range of about 6 mm or ¼″ to 13 mm or ½.

As clearly shown in FIG. 2, each strip 12′ or 12″ forms a multiplicity of integrally interconnected U-shaped pleats with bights 14′, 14″ and legs 22′, 22″. Legs 22′ of adjoining pleats of strips 12′ are closely juxtaposed and thermally bonded together at discrete locations 20′ representing crossover points of respective fibers thereof; similarly, legs 22″ of adjoining pleats of strips 12″ are thermally bonded at points 20″. Such bonding also exists at points 13′ and 13″ along respective interfaces between sheet 11 and strips 12′, 12″.

Figure 3:
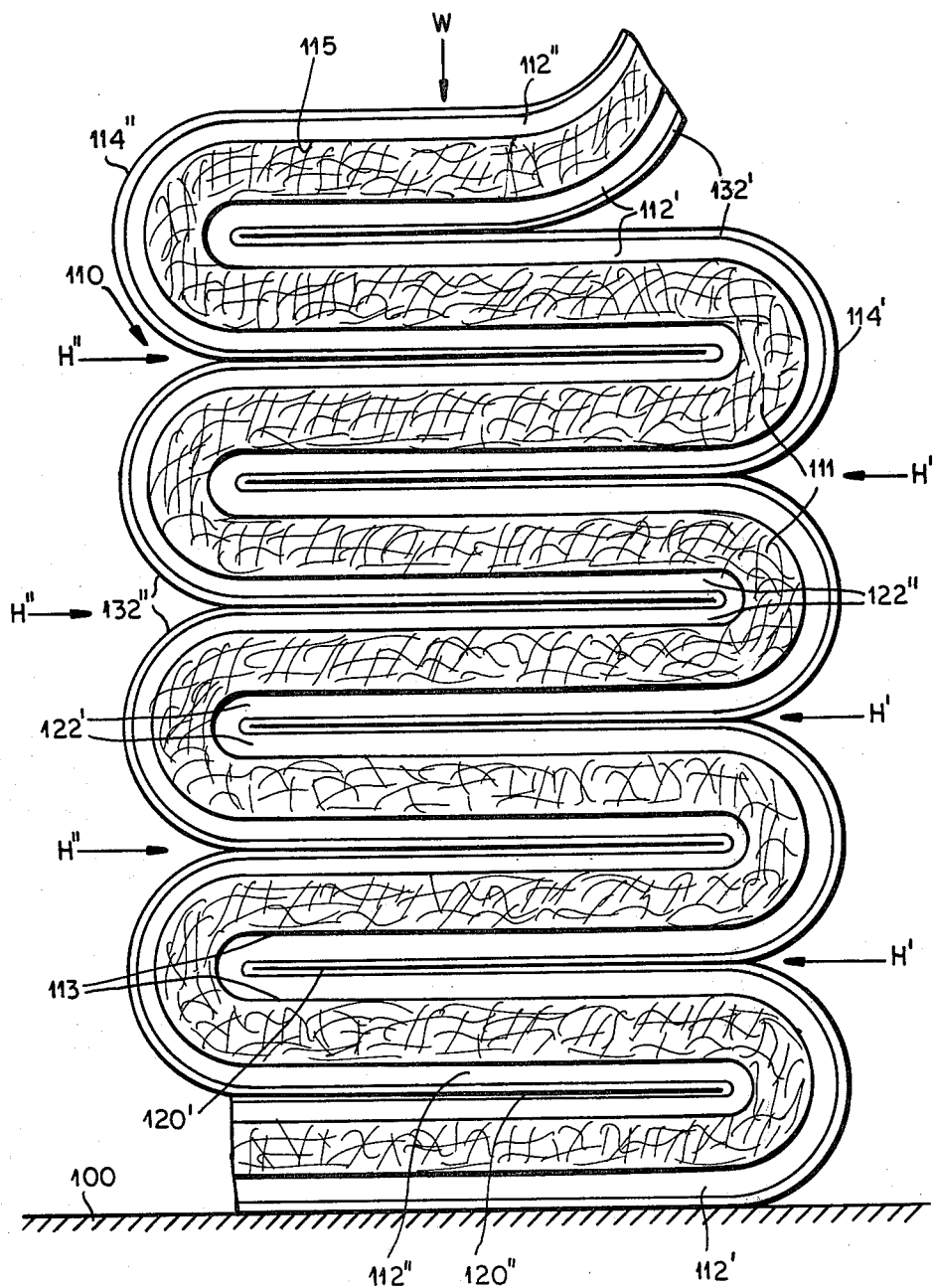
FIG. 3 is a view similar to that of FIG. 2 showing parts of a slightly modified filter pack in the course of assembly.

In FIG. 3 we have shown a modified stack 110 consisting of a sheet 111 whose undulations are sandwiched between retaining strips 112′ and 112″ of solid flexible yet substantially inelastic material (e.g. nylon) with a heat-fusible coating, such as a ternary copolyamide (e.g. as available under the name Versamid), forming a layer 132′, 132″ on the outer surface of each strip.

As in the preceding embodiment, legs 122′ and 122″ interleaved between the sheet undulations are thermally bonded at 120′ and 120″, the bond in this instance extending over the entire contact area. The components 111, 112′, 112″ are here held together, as in the filter pack of German printed specification No. 28 35 181, by surface roughness along interfaces 113 and 115.

FIG. 3 also illustrates a method of forming the stack which is shown placed on a horizontal support 100 and is thermally irradiated from opposite sides, in the direction of convergence of adjacent bights 114′ and 114″, as schematically indicated by arrows H′ and H″. During heating and for a short time thereafter, as required for a hardening of the thermal joints, the preformed undulations are maintained under a light pressure from a weight or a clamp as indicated by an arrow W. Thereafter, or even during that time, other parts of the sheet and the strips can be pleated to extend the stack whereupon the new undulations are subjected to the same heat treatment.

The process just described can, of course, also be used with the filamentary strips 12′, 12″ shown in FIG. 2. With irradiation of sufficient intensity and duration, not only the outermost fibers of strip legs 22′, 22″ but also those of adjacent sheet zones will be sufficiently softened, especially along the lateral strip edges, to form the aforedescribed bonds 13′, 13″ in addition to joints 20′, 20″. With careful dosing of the applied heat, the fibers in the interior of the strips as well as in the body of sheet 11 will remain firm so as to preserve the gas-permeable structure of the assembly.

We claim:

1. A filter pack for the purification of gaseous fluids, comprising an undulating sheet of porous material overlain on at least one side by a set of parallel, spaced-apart retaining strips folded into a series of integrally interconnected U-shaped pleats embracing respective undulations of said sheet, said sheet and said strips each consisting of a fleece of elastic fibers of heat-fusible thermoplastic material, adjacent pleats having closely juxtaposed legs thermally bonded to each other and to said sheet only at contact points of their respective fibers between undulations of said sheet.

2. A filter pack as defined in claim 1 wherein the other side of said sheet is overlain by a second set of parallel, spaced-apart strips substantially identical and aligned with the strips on said one side and with closely juxtaposed legs of adjacent pleats thermally bonded to each other and to said sheet at contact points of their fibers, the pleats of said sets of strips being mutually interleaved.

3. A filter pack defined in claim 1 or 2 wherein said thermoplastic material is polyethylene.

* * * * *